United States Patent
Otsuki et al.

(10) Patent No.: US 9,263,736 B2
(45) Date of Patent: Feb. 16, 2016

(54) POSITIVE ELECTRODE MATERIAL FOR LITHIUM ION SECONDARY BATTERY, POSITIVE ELECTRODE FOR LITHIUM ION SECONDARY BATTERY, AND LITHIUM ION SECONDARY BATTERY

(71) Applicant: TDK CORPORATION, Tokyo (JP)

(72) Inventors: Keitaro Otsuki, Tokyo (JP); Atsushi Sano, Tokyo (JP); Tomohiko Kato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 366 days.

(21) Appl. No.: 13/845,558

(22) Filed: Mar. 18, 2013

(65) Prior Publication Data

US 2013/0260253 A1 Oct. 3, 2013

(30) Foreign Application Priority Data

Mar. 27, 2012 (JP) ................. 2012-070961

(51) Int. Cl.
*H01M 4/36* (2006.01)
*H01M 4/485* (2010.01)
*H01M 4/58* (2010.01)
*H01M 4/131* (2010.01)
*H01M 4/136* (2010.01)
*H01M 10/0525* (2010.01)
*H01M 4/02* (2006.01)

(52) U.S. Cl.
CPC ............. *H01M 4/364* (2013.01); *H01M 4/131* (2013.01); *H01M 4/136* (2013.01); *H01M 4/485* (2013.01); *H01M 4/5825* (2013.01); *H01M 10/0525* (2013.01); *H01M 2004/021* (2013.01); *H01M 2004/028* (2013.01); *Y02E 60/122* (2013.01)

(58) Field of Classification Search
CPC ... H01M 4/364; H01M 4/5825; H01M 4/136; H01M 10/0525; H01M 2004/028; H01M 2004/021; Y02E 60/122
See application file for complete search history.

(56) References Cited

U.S. PATENT DOCUMENTS

| | | | |
|---|---|---|---|
| 2006/0093873 A1 | 5/2006 | Howard et al. | |
| 2006/0093894 A1 | 5/2006 | Scott et al. | |
| 2006/0095094 A1 | 5/2006 | Howard et al. | |
| 2006/0263695 A1 | 11/2006 | Dahn et al. | |
| 2011/0250497 A1* | 10/2011 | Gaubicher et al. | 429/207 |
| 2012/0213920 A1* | 8/2012 | Yanagita et al. | 252/182.1 |
| 2013/0078522 A1* | 3/2013 | Yanagita et al. | 429/231.2 |

FOREIGN PATENT DOCUMENTS

| | | |
|---|---|---|
| CN | 101048897 A | 10/2007 |
| CN | 101494123 A | 7/2009 |
| CN | 101595591 A | 12/2009 |
| JP | A-2001-500665 | 1/2001 |
| JP | A-2002-530835 | 9/2002 |
| JP | 2008-519399 A | 6/2008 |
| JP | 2009-231206 A | 10/2009 |
| WO | WO 98/12761 | 3/1998 |
| WO | WO 00/31812 | 6/2000 |

OTHER PUBLICATIONS

Qiao et al., "Electrochemical performance of carbon-coated $Li_3V_2(PO_4)_3$ cathode materials derived from polystyrene-based carbonthermal reduction synthesis," Electrochimica Acta (2010), vol. 56, pp. 510-516.

* cited by examiner

*Primary Examiner* — Laura Weiner
(74) *Attorney, Agent, or Firm* — Oliff PLC

(57) ABSTRACT

A positive electrode material for a lithium ion secondary battery contains a first compound represented by $Li_3V_2(PO_4)_3$ and one or more second compounds selected from vanadium oxide and lithium vanadium phosphate.

11 Claims, 2 Drawing Sheets

POSITIVE ELECTRODE MATERIAL FOR LITHIUM ION SECONDARY BATTERY, POSITIVE ELECTRODE FOR LITHIUM ION SECONDARY BATTERY, AND LITHIUM ION SECONDARY BATTERY

CROSS-REFERENCE TO RELATED APPLICATION

This application is based on Japanese Patent Application No. 2011-103894 filed with the Japan Patent Office on May 7, 2011, the entire content of which is hereby incorporated by reference.

BACKGROUND

1. Technical Field

The present disclosure relates to a positive electrode material for a lithium ion secondary battery, a positive electrode for a lithium ion secondary battery, and a lithium ion secondary battery.

2. Related Art

In recent years, a polyanion-based positive electrode active material typified by lithium iron phosphate ($LiFePO_4$) has been studied as a positive electrode active material having excellent crystal stability and thermal stability even at high temperatures. For instance, a nonaqueous electrolyte battery containing $LiFePO_4$ as a positive electrode active material has already been put into practical use in electric tools. This battery has a high discharge capacity of approximately 160 mAh/g. This battery also has excellent high-rate performance due to a technique for allowing the surface of a positive electrode active material to carry an electronically conductive carbonaceous material.

However, the operating potential of $LiFePO_4$ is 3.42 V relative to $Li/Li^+$ reference, and is lower than the operating potential of a positive electrode active material used for a general battery. Therefore, $LiFePO_4$ is insufficient in terms of energy density and output characteristic.

In view of this, $Li_3V_2(PO_4)_3$ has been suggested as the polyanion positive electrode active material which has higher operating potential than $LiFePO_4$.

It is known that a nonaqueous electrolyte battery containing $Li_3V_2(PO_4)_3$ as a positive electrode active material exhibits a capacity as high as 130 mAh/g at low-rate discharge (see, for example, JP-T-2001-500665 and JP-T-2002-530835).

SUMMARY

A positive electrode material for a lithium ion secondary battery contains a first compound represented by $Li_3V_2(PO_4)_3$ and one or more second compounds selected from vanadium oxide and lithium vanadium phosphate.

DETAILED DESCRIPTION

Figure 1:
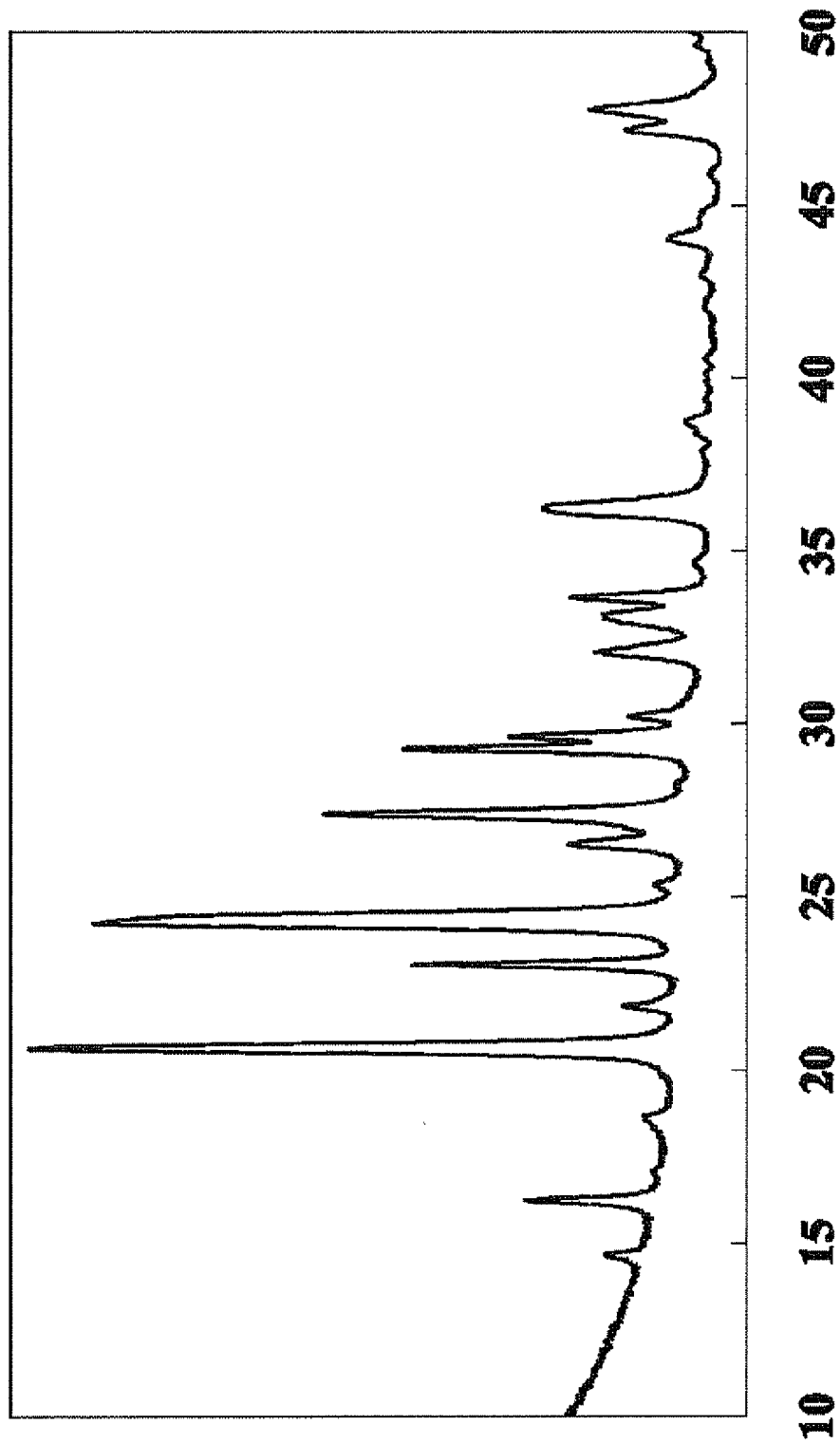
FIG. 1 is an X-ray diffraction chart of a positive electrode material for a lithium ion secondary battery according to Example 1.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, the nonaqueous electrolyte battery containing $Li_3V_2(PO_4)_3$ as the positive electrode active material has a problem in characteristic at high-rate discharge (see, for example, "Y. Q. Qiao. et. al., Electrochem. Acta 56 (2010) 510-516").

It is an object of the present disclosure to provide a positive electrode material for a lithium ion secondary battery, a positive electrode for a lithium ion secondary battery, and a lithium ion secondary battery, which have an excellent characteristic at high-rate discharge (particularly, excellent capacity retention).

A positive electrode material for a lithium ion secondary battery according to the present disclosure (hereinafter, referred to as a "present positive electrode material") contains a first compound represented by $Li_3V_2(PO_4)_3$ and one or more second compounds selected from vanadium oxide and lithium vanadium phosphate.

The positive electrode material containing the first compound and the second compound can improve the high-rate discharge characteristic of a lithium ion secondary battery containing this positive electrode material.

This improvement may be due to the formation of an electric conduction network path between particles of the first compound ($Li_3V_2(PO_4)_3$) via vanadium oxide or lithium vanadium phosphate as the second compound.

In the present positive electrode material, the second compound preferably includes at least one of $V_2O_5$, $LiV_2O_4$, $LiV_3O_8$, and $LiVOPO_4$.

Any of the above second compounds can further improve the high-rate charging/discharging characteristic of the first compound $Li_3V_2(PO_4)_3$.

In the present positive electrode material, the content of the second compound relative to the first compound is preferably 0.1 wt. % or more and 5 wt. % or less.

This can further improve the high-rate charging/discharging characteristic of the first compound $Li_3V_2(PO_4)_3$.

According to the present disclosure, a positive electrode material for a lithium ion secondary battery, a positive electrode for a lithium ion secondary battery, and a lithium ion secondary battery, which have an excellent characteristic at high-rate discharge (particularly, excellent capacity retention), can be provided.

A preferred embodiment of the present disclosure is hereinafter described with reference to drawings. Note that the present disclosure is not limited to the following embodiment. Moreover, the components described below include substantially the same components as those that can be easily conceived by those skilled in the art. Furthermore, the components described below can be combined with each other as appropriate.

Lithium Ion Secondary Battery

Figure 2:
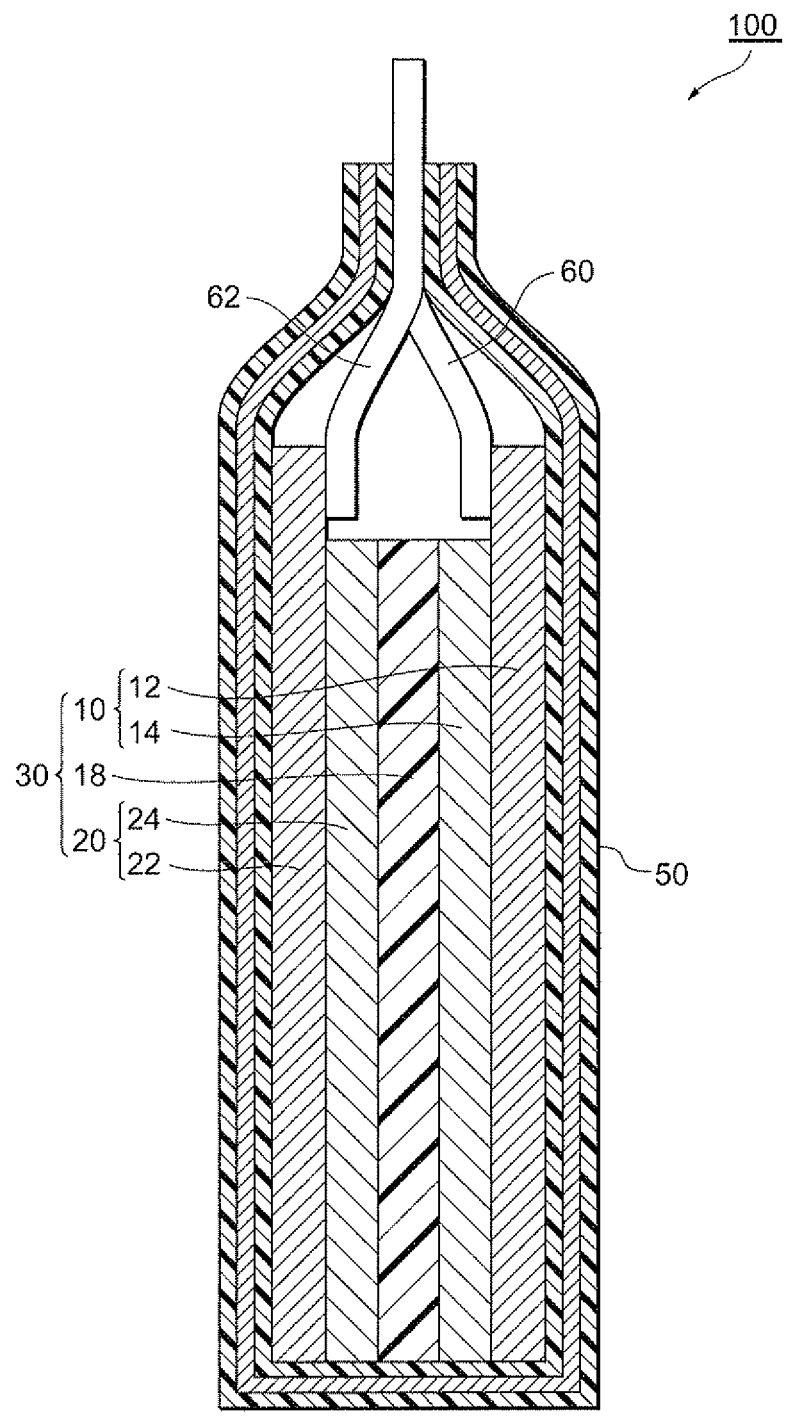
FIG. 2 is a schematic cross-sectional view of a lithium ion secondary battery.

As depicted in FIG. 2, a lithium ion secondary battery 100 according to this embodiment includes a power generating element 30, a nonaqueous electrolyte solution containing lithium ions, a case 50, a negative electrode lead 62, and a positive electrode lead 60.

The power generating element 30 includes a plate-like negative electrode 20 and a plate-like positive electrode 10, which face each other, and a plate-like separator 18. The separator 18 is disposed adjacent to and between the negative electrode 20 and the positive electrode 10. The case 50 houses the power generating element 30 and the electrolyte solution in a sealed state. One end of the negative electrode lead 62 is electrically connected to the negative electrode 20. The other end of the negative electrode lead 62 protrudes out of the case 50. One end of the positive electrode lead 60 is electrically connected to the positive electrode 10. The other end of the positive electrode lead 60 protrudes out of the case 50

The negative electrode 20 includes a negative electrode current collector 22, and a negative electrode active material layer 24 formed on the negative electrode current collector 22. The positive electrode 10 includes a positive electrode current collector 12, and a positive electrode active material layer 14 formed on the positive electrode current collector 12. The separator 18 is disposed between the negative electrode active material layer 24 and the positive electrode active material layer 14.

The positive electrode active material layer 14 contains the positive electrode material for a lithium ion secondary battery of this embodiment (the present positive electrode material), a conductive auxiliary agent, and a binder. The positive electrode material for a lithium ion secondary battery contains the first compound represented by $Li_3V_2(PO_4)_3$ and one or more kinds of the second compounds selected from vanadium oxide and lithium vanadium phosphate.

Present Positive Electrode Material

The present positive electrode material contains the first compound represented by $Li_3V_2(PO_4)_3$ and one or more kinds of the second compounds selected from vanadium oxide and lithium vanadium phosphate. The first compound is NASICON type lithium vanadium phosphate, which is represented by the general formula $Li_3V_2(PO_4)_3$.

A part of V in the first compound $Li_3V_2(PO_4)_3$ (for example, approximately 5 wt. %) may be replaced by a transition metal typified by Fe or Mn, or may be absent.

Examples of vanadium oxide and lithium vanadium phosphate as the second compounds include conventionally known materials such as $V_2O_5$, $LiV_2O_4$, $LiV_3O_8$, and $LiVOPO_4$. The present positive electrode material contains at least one compound selected from these compounds or may alternatively contain a plurality of the above compounds.

The second compound may be mixed with primary particles of the first compound, or may be mixed with secondary particles of the first compound. The second compound may be attached to the surface of the primary or secondary particles of the first compound.

The second compound may cover entirely the surface of the primary particle or the secondary particle of the first compound or may cover a part of the surface thereof.

The particle diameter of the first compound is preferably in the range of 100 nm to 10 µm. The particle diameter of the second compound is preferably in the range of 10 nm to 1 µm. The particle diameter of the second compound is desirably smaller than that of the first compound.

The amount of the second compound relative to the amount of the first compound is desirably 0.1 wt. % or more and 5 wt. % or less.

Manufacturing Method for the Present Positive Electrode Material

Next, a manufacturing method for the present positive electrode material is described. The manufacturing method for the present positive electrode material includes a precursor synthesizing step, a complexing step, a heat treatment step, and a second compound mixing step. In the precursor synthesizing step, the entire amount of mixture including a lithium source, a phosphate source, a vanadium source, a reduction agent, and water is dried. This results in an amorphous precursor. In the complexing step, a precursor is obtained. The present positive electrode material can be synthesized by any of existing methods including a solid phase method, a hydrothermal method, a sol-gel method, a gas phase method, and the like. In the heat treatment step, the obtained precursor is heat-treated.

Precursor Synthesizing Step

In the precursor synthesizing step, first, the above lithium source, phosphate source, vanadium source, and reduction agent are added to water, thereby providing a mixture (aqueous solution) in which these are dispersed. Note that the mixture may be prepared in a manner that, for example, the mixture including the phosphate source, the manganese source, and water is refluxed first and then the lithium source is added to the refluxed mixture.

The entire amount of the mixture (aqueous solution) obtained through the above step is dried. Thus, the precursor is obtained. This drying can be performed using any of existing devices that can apply heat from outside, such as a drier or an electric furnace.

The lithium source includes, for example, at least one selected from the group consisting of $LiNO_3$, $Li_2Co_3$, $LiOH$, $LiCl$, $Li_2SO_4$, and $CH_3COOLi$.

The phosphate source includes, for example, at least one selected from the group consisting of $H_3PO_4$, $NH_4H_2PO_4$, $(NH_4)_2HPO_4$, and $Li_3PO_4$.

The vanadium source includes, for example, at least one selected from the group consisting of $V_2O_5$, $VO_2$, $V_2O_3$, and $NH_4VO_3$. Note that two or more kinds of lithium sources, two or more kinds of phosphate sources, or two or more kinds of vanadium sources may be used in combination; in this case, the mixture ratio of each raw material is adjusted as appropriate.

The reduction agent includes, for example, at least one kind selected from ascorbic acid, citric acid, tartaric acid, polyethylene, polyethylene glycol, and hydrazine. Two or more kinds of reduction agents may be used in combination; in this case, the mixture ratio of the reduction agents is adjusted as appropriate.

The precursor synthesizing step may be performed at room temperature or performed at a temperature higher than or equal to the room temperature using an oil bath or the like.

Complexing Step

In the complexing step, an electronically conductive carbonaceous material and the amorphous precursor obtained by the precursor synthesizing step are complexed. Thus, the precursor is obtained.

In the complexing method, for example, a known device such as a bead mill or a ball mill is used.

The electronically conductive carbonaceous material used may contain at least one kind of carbon material including acetylene black, carbon black, Ketjen black, and the like.

Heat Treatment Step

In the heat treatment step, the precursor obtained by the complexing step is heat-treated in a reductive atmosphere. Thus, $Li_3V_2(PO_4)_3$ can be synthesized.

The heat treatment atmosphere may be, for example, at least one selected from the group consisting of inert gases such as nitrogen and argon, reductive gases such as hydrogen, and mixture gases thereof.

The temperature of the heat treatment is preferably 450° C. to 650° C., and more preferably 550° C. to 600° C. When the temperature of the heat treatment is too low, a $Li_3V_2(PO_4)_3$ phase is difficult to generate. Therefore, it is difficult to maintain the structure of the precursor and the charging/discharging characteristic of the active material tends to deteriorate. When the temperature of the heat treatment is too high, the $Li_3V_2(PO_4)_3$ phase is easily decomposed so that the target compound is difficult to obtain. By setting the temperature of the heat treatment in the above range, these tendencies can be suppressed.

Second Compound Mixing Step

The second compound is selected from vanadium oxide and lithium vanadium phosphate. In the second compound mixing step, the second compound is mixed with the first compound, $Li_3V_2(PO_4)_3$, which is obtained in the aforementioned steps.

For the mixing in this step, an existing mixing device such as an agate mortar, a ball mill, or a bead mill can be used.

The second compound may be added to or mixed with the first compound in any of the aforementioned precursor synthesizing step, complexing step, and heat treatment step.

The ratios of the lithium source, the vanadium source, and the phosphate source can be deviated from the stoichiometric composition of the first compound, $Li_3V_2(PO_4)_3$, in the precursor synthesizing step to generate the second compound and mix the second compound with the first compound.

The amount (amount of mixing) of the second compound relative to the first compound is preferably 0.1 wt. % or more and 5 wt. % or less, and more preferably 0.5 wt. % or more and 1.5 wt. % or less. When the amount of the second compound is in the above range, a conductive network is formed between the particles of the first compound. It is considered that this improves the rate characteristic of the first compound. When the amount of the second compound is less than 0.1 wt. %, the amount is too small, so that the above effect is difficult to obtain. When the amount of the second compound is more than 5 wt. %, the amount of the second compound interrupts the electrochemical reaction of the first compound. It is considered that this deteriorates the rate characteristic of the first compound.

EXAMPLES

Hereinafter, the present positive electrode material is described more specifically with reference to examples and comparative examples. However, the present disclosure is not limited to the examples below.

Example 1

Synthesis of Lithium Vanadium Phosphate

A solution including 0.3 mol of $H_3PO_4$ and 180 ml of distilled water was stirred at 20° C. Then, 0.1 mol of $V_2O_5$ was added to the solution and further stirred. Subsequently, hydrazine was added to the solution while being continuously stirred, followed by addition of 0.3 mol of $LiOH.H_2O$ to the solution. The mixture solution was stirred at 20° C. for 24 hours. Consequently, a raw-material mixture solution was obtained. The obtained raw-material mixture solution was dried at 90° C. for 24 hours using a drier.

A solid obtained after the drying was crushed to give a precursor of ($Li_3V_2(PO_4)_3$) in powder form.

Subsequently, 84 parts by weight of the precursor was mixed with 8 parts by weight of carbon black for 3 minutes to give a Li—V—P—C mixture powder.

The resulting Li—V—P—C mixture powder was mixed with $LiVOPO_4$. The amount of $LiVOPO_4$ to be mixed with $Li_3V_2(PO_4)_3$ was 1 wt. %. After that, the mixture powder was heat-treated under argon flow at 600° C. for 4 hours. Consequently, the positive electrode material was obtained. FIG. 1 is an X-ray diffraction chart of the present positive electrode material obtained as described above. As is evident from this chart, almost all the peaks are the peaks of $Li_3V_2(PO_4)_3$. In this chart, however, low peaks representing the second compound are observed in the vicinity of 18° and 29°. It is therefore understood that this positive electrode material contains the first compound $Li_3V_2(PO_4)_3$ and 1 wt. % of the second compound $LiVOPO_4$.

Production of Half-cell

A positive electrode coating was prepared by adding 92 parts by weight of the heat-treated material for the positive electrode and 8 parts by weight of PVDF (polyvinylidene fluoride) to NMP (N-methyl-2-pyrrolidone). The ratio of $Li_3V_2(PO_4)_3$ to carbon black and PVDF as solids in the positive electrode coating was adjusted to be $Li_3V_2(PO_4)_3$:carbon black:PVDF=84:8:8 in terms of parts by weight.

The positive electrode coating was applied to an aluminum foil of 20 μm in thickness. Subsequently, the applied positive electrode coating was dried and then subjected to rolling, thereby obtaining a positive electrode. Next, a lithium foil, which was cut into a predetermined size, was attached to a copper foil (15 μm in thickness) to give a negative electrode. The positive electrode, a separator made of a polyethylene microporous film, and the negative electrode were stacked in this order to form a laminate (hereinafter, also referred to as a "base body"). In this laminate, the separator is held between the positive electrode and the negative electrode.

For the positive electrode, an aluminum foil (of 4 mm in width, 40 mm in length, and 80 μm in thickness) was welded with ultrasonic waves and provided as a lead. For the negative electrode, a nickel foil (of 4 mm in width, 40 mm in length, and 80 μm in thickness) was welded with ultrasonic waves and provided as a lead. Around each of the leads, polypropylene (PP) as grafted maleic anhydride was wound and thermally adhered in advance. This polypropylene improves the sealing property between the lead and the case.

The material of the case is an aluminum laminated material. The configuration of the aluminum laminated material is PET (12)/Al (40)/PP (50). Here, PET stands for polyethylene terephthalate and PP stands for polypropylene. The numerals in parentheses represent the thickness of each layer (unit: μm). The aluminum laminated material was made into a bag so that PP could be disposed inside the case. The laminate including the positive electrode, the separator, and the negative electrode was placed in the case and an electrolyte solution 1M-$LiPF_6$/EC+DEC (30:70 in volume ratio) was then injected into the case. Subsequently, the case was heat-sealed under vacuum. Consequently, a half-cell for electrode evaluation according to Example 1 was produced.

Measurement of Discharge Capacity

The half-cell of Example 1 was charged and then discharged, followed by measurement of the discharge capacity (unit: mAh/g) of the half-cell.

In this measurement, the theoretical capacity of the positive electrode active material $Li_3V_2(PO_4)_3$ was set to 196 mAh/g. In charging, the upper limit of charging voltage was set to 4.3 V (VS. $Li/Li^+$). The charging was performed until the voltage of the positive electrode reached the upper limit of the charging voltage and the charging current was reduced to ¹/₂₀ C. In discharging, the lower limit of discharging voltage was set to 2.8 V (VS. $Li/Li^+$). The discharging rate was 0.1 C and 2 C. The current value of 0.1 C is a current value at which the discharging ends after 10-hour constant-current discharging. From this measurement results, the ratio (discharge retention) of the discharge capacity per 1 gram of the active material at the discharge rate 2 C to the discharge capacity per 1 gram of the active material at the discharge rate 0.1 C was obtained. The measurement temperature was 25° C. Table 1 shows the discharge retention of the half-cell of Example 1.

Example 2

An active material and a half-cell of Example 2 were produced by a method similar to that of Example 1 except that the amounts of the lithium source, the phosphate source, and the vanadium source as raw materials were each adjusted to an amount exceeding the stoichiometric composition by 0.00024 mol and except that the second compound was not mixed. The results of the X-ray diffraction measurement (XRD) indicated that the second compound contained in the active material was $LiVOPO_4$ and the content thereof was 0.1 wt. %.

Example 3

An active material and a half-cell of Example 3 were produced by a method similar to that of Example 1 except that the amount of $LiVOPO_4$ as the second compound to be mixed with $Li_3V_2(PO_4)_3$ was 0.5 wt. % (the amounts of the lithium source, the phosphate source, and the vanadium source as raw materials were the same as those of Example 1). The results of XRD indicated that the second compound contained in the active material was $LiVOPO_4$ and the content thereof was 0.5 wt. %.

Example 4

An active material and a half-cell of Example 4 were produced by a method similar to that of Example 1 except that the amounts of the lithium source, the phosphate source, and the vanadium source as raw materials were each adjusted to an amount exceeding the stoichiometric composition by 0.0048 mol and except that the second compound was not mixed. The results of XRD indicated that the second compound contained in the active material was $LiVOPO_4$ and the content thereof was 2.0 wt. %.

Example 5

An active material and a half-cell of Example 5 were produced by a method similar to that of Example 1 except that the amount of $LiVOPO_4$ as the second compound to be mixed with $Li_3V_2(PO_4)_3$ was 3.0 wt. % (the amounts of the lithium source, the phosphate source, and the vanadium source as raw materials were the same as those of Example 1). The results of XRD indicated that the second compound contained in the active material was $LiVOPO_4$ and the content thereof was 3.0 wt. %.

Example 6

An active material and a half-cell of Example 6 were produced by a method similar to that of Example 1 except that the amounts of the lithium source, the phosphate source, and the vanadium source as raw materials were each adjusted to an amount exceeding the stoichiometric composition by 0.012 mol and except that the second compound was not mixed. The results of XRD indicated that the second compound contained in the active material was $LiVOPO_4$ and the content thereof was 5.0 wt. %.

Example 7

An active material and a half-cell of Example 7 were produced by a method similar to that of Example 1 except that the amounts of the lithium source, the phosphate source, and the vanadium source as raw materials were each adjusted to an amount exceeding the stoichiometric composition by 0.00012 mol and except that the second compound was not mixed. The results of XRD indicated that the second compound contained in the active material was $LiVOPO_4$ and the content thereof was 0.05 wt. %.

Example 8

An active material and a half-cell of Example 8 were produced by a method similar to that of Example 1 except that the amounts of the lithium source, the phosphate source, and the vanadium source as raw materials were each adjusted to an amount exceeding the stoichiometric composition by 0.0144 mol and except that the second compound was not mixed. The results of XRD indicated that the second compound contained in the active material was $LiVOPO_4$ and the content thereof was 6.0 wt. %.

Example 9

An active material and a half-cell of Example 9 were produced by a method similar to that of Example 1 except that $V_2O_5$ was used as the vanadium source as the raw material, that the amount of the vanadium source was adjusted to an amount exceeding the stoichiometric composition by 0.00287 mol, and that the second compound was not mixed. The results of XRD indicated that the second compound contained in the active material was $V_2O_5$ and the content thereof was 1.0 wt. %.

Example 10

An active material and a half-cell of Example 10 were produced by a method similar to that of Example 1 except that $V_2O_5$ was used as the vanadium source as the raw material, that the amount of the vanadium source was adjusted to an amount exceeding the stoichiometric composition by 0.000288 mol, and that the second compound was not mixed. The results of XRD indicated that the second compound contained in the active material was $V_2O_5$ and the content thereof was 0.1 wt. %.

Example 11

An active material and a half-cell of Example 11 were produced by a method similar to that of Example 1 except that $V_2O_5$ was used as the vanadium source as the raw material, that the amount of the vanadium source was adjusted to an amount exceeding the stoichiometric composition by 0.00143 mol, and that the second compound was not mixed. The results of XRD indicated that the second compound contained in the active material was $V_2O_5$ and the content thereof was 0.5 wt. %.

Example 12

An active material and a half-cell of Example 12 were produced by a method similar to that of Example 1 except that $V_2O_5$ was used as the vanadium source as the raw material, that the amount of the vanadium source was adjusted to an amount exceeding the stoichiometric composition by 0.00566 mol, and that the second compound was not mixed. The results of XRD indicated that the second compound contained in the active material was $V_2O_5$ and the content thereof was 2.0 wt. %.

Example 13

An active material and a half-cell of Example 13 were produced by a method similar to that of Example 1 except that $V_2O_5$ was used as the vanadium source as the raw material, that the amount of the vanadium source was adjusted to an amount exceeding the stoichiometric composition by 0.00864 mol, and that the second compound was not mixed. The results of XRD indicated that the second compound contained in the active material was $V_2O_5$ and the content thereof was 3.0 wt. %.

Example 14

An active material and a half-cell of Example 14 were produced by a method similar to that of Example 1 except that $V_2O_5$ was used as the vanadium source as the raw material, that the amount of the vanadium source was adjusted to an amount exceeding the stoichiometric composition by 0.0144 mol, and that the second compound was not mixed. The results of XRD indicated that the second compound contained in the active material was $V_2O_5$ and the content thereof was 5.0 wt. %.

Example 15

An active material and a half-cell of Example 15 were produced by a method similar to that of Example 1 except that $V_2O_5$ was used as the vanadium source as the raw material, that the amount of the vanadium source was adjusted to an amount exceeding the stoichiometric composition by 0.000144 mol, and that the second compound was not mixed. The results of XRD indicated that the second compound contained in the active material was $V_2O_5$ and the content thereof was 0.05 wt. %.

Example 16

An active material and a half-cell of Example 16 were produced by a method similar to that of Example 1 except that $V_2O_5$ was used as the vanadium source as the raw material, that the amount of the vanadium source was adjusted to an amount exceeding the stoichiometric composition by 0.01728 mol, and that the second compound was not mixed. The results of XRD indicated that the second compound contained in the active material was $V_2O_5$ and the content thereof was 6.0 wt. %.

Example 17

An active material and a half-cell of Example 17 were produced by a method similar to that of Example 1 except that the amount of the lithium source as the raw material was adjusted to an amount exceeding the stoichiometric composition by 0.00306 mol, that $V_2O_5$ was used as the vanadium source, that the amount of the vanadium source was adjusted to an amount exceeding the stoichiometric composition by 0.00306 mol, and that the second compound was not mixed. The results of XRD indicated that the second compound contained in the active material was $LiV_2O_4$ and the content thereof was 1.0 wt. %.

Example 18

An active material and a half-cell of Example 18 were produced by a method similar to that of Example 1 except that the amount of the lithium source as the raw material was adjusted to an amount exceeding the stoichiometric composition by 0.000306 mol, that $V_2O_5$ was used as the vanadium source, that the amount of the vanadium source was adjusted to an amount exceeding the stoichiometric composition by 0.000306 mol, and that the second compound was not mixed. The results of XRD indicated that the second compound contained in the active material was $LiV_2O_4$ and the content thereof was 0.1 wt. %.

Example 19

An active material and a half-cell of Example 19 were produced by a method similar to that of Example 1 except that the amount of the lithium source as the raw material was adjusted to an amount exceeding the stoichiometric composition by 0.00153 mol, that $V_2O_5$ was used as the vanadium source, that the amount of the vanadium source was adjusted to an amount exceeding the stoichiometric composition by 0.00153 mol, and that the second compound was not mixed. The results of XRD indicated that the second compound contained in the active material was $LiV_2O_4$ and the content thereof was 0.5 wt. %.

Example 20

An active material and a half-cell of Example 20 were produced by a method similar to that of Example 1 except that the amount of the lithium source as the raw material was adjusted to an amount exceeding the stoichiometric composition by 0.00612 mol, that $V_2O_5$ was used as the vanadium source, that the amount of the vanadium source was adjusted to an amount exceeding the stoichiometric composition by 0.00612 mol, and that the second compound was not mixed. The results of XRD indicated that the second compound contained in the active material was $LiV_2O_4$ and the content thereof was 2.0 wt. %.

Example 21

An active material and a half-cell of Example 21 were produced by a method similar to that of Example 1 except that the amount of the lithium source as the raw material was adjusted to an amount exceeding the stoichiometric composition by 0.00918 mol, that $V_2O_5$ was used as the vanadium source, that the amount of the vanadium source was adjusted to an amount exceeding the stoichiometric composition by 0.00918 mol, and that the second compound was not mixed. The results of XRD indicated that the second compound contained in the active material was $LiV_2O_4$ and the content thereof was 3.0 wt. %.

Example 22

An active material and a half-cell of Example 22 were produced by a method similar to that of Example 1 except that the amount of the lithium source as the raw material was adjusted to an amount exceeding the stoichiometric composition by 0.0153 mol, that $V_2O_5$ was used as the vanadium source, that the amount of the vanadium source was adjusted to an amount exceeding the stoichiometric composition by 0.0153 mol, and that the second compound was not mixed. The results of XRD indicated that the second compound contained in the active material was $LiV_2O_4$ and the content thereof was 5.0 wt. %.

Example 23

An active material and a half-cell of Example 23 were produced by a method similar to that of Example 1 except that the amount of the lithium source as the raw material was adjusted to an amount exceeding the stoichiometric composition by 0.000153 mol, that $V_2O_5$ was used as the vanadium source, that the amount of the vanadium source was adjusted to an amount exceeding the stoichiometric composition by 0.000153 mol, and that the second compound was not mixed. The results of XRD indicated that the second compound contained in the active material was $LiV_2O_4$ and the content thereof was 0.05 wt. %.

Example 24

An active material and a half-cell of Example 24 were produced by a method similar to that of Example 1 except that the amount of the lithium source as the raw material was adjusted to an amount exceeding the stoichiometric composition by 0.01836 mol, that $V_2O_5$ was used as the vanadium source, that the amount of the vanadium source was adjusted to an amount exceeding the stoichiometric composition by 0.01836 mol, and that the second compound was not mixed. The results of XRD indicated that the second compound contained in the active material was $LiV_2O_4$ and the content thereof was 6.0 wt. %.

Example 25

An active material and a half-cell of Example 25 were produced by a method similar to that of Example 1 except that the amount of the lithium source as the raw material was adjusted to an amount exceeding the stoichiometric composition by 0.00178 mol, that $VO_2$ was used as the vanadium source, that the amount of the vanadium source was adjusted to an amount exceeding the stoichiometric composition by 0.0052 mol, and that the second compound was not mixed. The results of XRD indicated that the second compound contained in the active material was $LiV_3O_8$ and the content thereof was 1.0 wt. %.

Example 26

An active material and a half-cell of Example 26 were produced by a method similar to that of Example 1 except that the amount of the lithium source as the raw material was adjusted to an amount exceeding the stoichiometric composition by 0.000178 mol, that $VO_2$ was used as the vanadium source, that the amount of the vanadium source was adjusted to an amount exceeding the stoichiometric composition by 0.00052 mol, and that the second compound was not mixed. The results of XRD indicated that the second compound contained in the active material was $LiV_3O_8$ and the content thereof was 0.1 wt. %.

Example 27

An active material and a half-cell of Example 27 were produced by a method similar to that of Example 1 except that the amount of the lithium source as the raw material was adjusted to an amount exceeding the stoichiometric composition by 0.00089 mol, that $VO_2$ was used as the vanadium source, that the amount of the vanadium source was adjusted to an amount exceeding the stoichiometric composition by 0.0026 mol, and that the second compound was not mixed. The results of XRD indicated that the second compound contained in the active material was $LiV_3O_8$ and the content thereof was 0.5 wt. %.

Example 28

An active material and a half-cell of Example 28 were produced by a method similar to that of Example 1 except that the amount of the lithium source as the raw material was adjusted to an amount exceeding the stoichiometric composition by 0.00356 mol, that $VO_2$ was used as the vanadium source, that the amount of the vanadium source was adjusted to an amount exceeding the stoichiometric composition by 0.0104 mol, and that the second compound was not mixed. The results of XRD indicated that the second compound contained in the active material was $LiV_3O_8$ and the content thereof was 2.0 wt. %.

Example 29

An active material and a half-cell of Example 29 were produced by a method similar to that of Example 1 except that the amount of $LiV_3O_8$ as the second compound to be mixed with $Li_3V_2(PO_4)_3$ was 3.0 wt. % (the amounts of the lithium source, the phosphate source, and the vanadium source as raw materials were the same as those of Example 1). The results of XRD indicated that the second compound contained in the active material was $LiV_3O_8$ and the content thereof was 3.0 wt. %.

Example 30

An active material and a half-cell of Example 30 were produced by a method similar to that of Example 1 except that the amount of the lithium source as the raw material was adjusted to an amount exceeding the stoichiometric composition by 0.0089 mol, that $VO_2$ was used as the vanadium source, that the amount of the vanadium source was adjusted to an amount exceeding the stoichiometric composition by 0.026 mol, and that the second compound was not mixed. The results of XRD indicated that the second compound contained in the active material was $LiV_3O_8$ and the content thereof was 5.0 wt. %.

Example 31

An active material and a half-cell of Example 31 were produced by a method similar to that of Example 1 except that the amount of the lithium source as the raw material was adjusted to an amount exceeding the stoichiometric composition by 0.000089 mol, that $VO_2$ was used as the vanadium source, that the amount of the vanadium source was adjusted to an amount exceeding the stoichiometric composition by 0.00026 mol, and that the second compound was not mixed. The results of XRD indicated that the second compound contained in the active material was $LiV_3O_8$ and the content thereof was 0.05 wt. %.

Example 32

An active material and a half-cell of Example 32 were produced by a method similar to that of Example 1 except that the amount of $LiV_3O_8$ as the second compound to be mixed with $Li_3V_2(PO_4)_3$ was 6.0 wt. %. The results of XRD indicated that the second compound contained in the active material was $LiV_3O_8$ and the content thereof was 6.0 wt. %.

Example 33

$V_2O_5$ in an amount of 0.4 wt. % was added to the positive electrode active material obtained in Example 2 that contains 0.1 wt. % of $LiVOPO_4$. Thus, an active material and a half-cell of Example 33 were produced. The results of XRD indicated that the second compounds contained in the active material were $LiVOPO_4$ and $V_2O_5$ and the total content thereof was 0.5 wt. %.

Example 34

$V_2O_5$ in an amount of 0.9 wt. % was added to the positive electrode active material obtained in Example 2 that contains 0.1 wt. % of $LiVOPO_4$ as the second compound. Thus, an active material and a half-cell of Example 34 were produced. The results of XRD indicated that the second compounds contained in the active material were $LiVOPO_4$ and $V_2O_5$ and the total content thereof was 1.0 wt. %.

Example 35

$V_2O_5$ in an amount of 2.5 wt. % was added to the positive electrode active material obtained in Example 3 that contains 0.5 wt. % of $LiVOPO_4$. Thus, an active material and a half-cell of Example 35 were produced. The results of XRD indicated that the second compounds contained in the active material were $LiVOPO_4$ and $V_2O_5$ and the total content thereof was 3.0 wt. %.

Example 36

$V_2O_5$ in an amount of 4.0 wt. % was added to the positive electrode active material obtained in Example 4 that contains 2.0 wt. % of $LiVOPO_4$ as the second compound. Thus, an active material and a half-cell of Example 36 were produced. The results of XRD indicated that the second compounds contained in the active material were $LiVOPO_4$ and $V_2O_5$ and the total content thereof was 6.0 wt. %.

Example 37

$LiV_2O_4$ in an amount of 0.9 wt. % was added to the positive electrode active material obtained in Example 10 that contains 0.1 wt. % of $V_2O_5$ as the second compound. Thus, an active material and a half-cell of Example 37 were produced. The results of XRD indicated that the second compounds contained in the active material were $V_2O_5$ and $LiV_2O_4$ and the total content thereof was 1.0 wt. %.

Example 38

$LiV_2O_4$ in an amount of 0.4 wt. % was added to the positive electrode active material obtained in Example 10 that contains 0.1 wt. % of $V_2O_5$ as the second compound. Thus, an active material and a half-cell of Example 38 were produced. The results of XRD indicated that the second compounds contained in the active material were $V_2O_5$ and $LiV_2O_4$ and the total content thereof was 0.5 wt. %.

Example 39

$LiV_2O_4$ in an amount of 2.0 wt. % was added to the positive electrode active material obtained in Example 11 that contains 0.1 wt. % of $V_2O_5$ as the second compound, which was obtained in Example 11, 2.0 wt. % of $LiV_2O_4$ was added. Thus, an active material and a half-cell of Example 39 were produced. The results of XRD indicated that the second compounds contained in the active material were $V_2O_5$ and $LiV_2O_4$ and the total content thereof was 3.0 wt. %.

Example 40

$LiV_2O_4$ in an amount of 5.0 wt. % was added to the positive electrode active material obtained in Example 11 that contains 1.0 wt. % of $V_2O_5$ as the second compound. Thus, an active material and a half-cell of Example 40 were produced. The results of XRD indicated that the second compounds contained in the active material were $V_2O_5$ and $LiV_2O_4$ and the total content thereof was 6.0 wt. %.

Example 41

$LiV_3O_8$ in an amount of 0.9 wt. % was added to the positive electrode active material obtained in Example 2 that contains 0.1 wt. % of $LiVOPO_4$ as the second compound. Thus, an active material and a half-cell of Example 41 were produced. The results of XRD indicated that the second compounds contained in the active material were $LiVOPO_4$ and $LiV_3O_8$ and the total content thereof was 1.0 wt. %.

Example 42

$LiV_3O_8$ in an amount of 0.4 wt. % was added to the positive electrode active material obtained in Example 2 that contains 0.1 wt. % of $LiVOPO_4$ as the second compound. Thus, an active material and a half-cell of Example 42 were produced. The results of XRD indicated that the second compounds contained in the active material were $LiVOPO_4$ and $LiV_3O_8$ and the total content thereof was 0.5 wt. %.

Example 43

$LiV_3O_8$ in an amount of 2.0 wt. % was added to the positive electrode active material obtained in Example 1 that contains 1.0 wt. % of $LiVOPO_4$ as the second compound. Thus, an active material and a half-cell of Example 43 were produced. The results of XRD indicated that the second compounds contained in the active material were $LiVOPO_4$ and $LiV_3O_8$ and the total content thereof was 3.0 wt. %.

Example 44

$LiV_3O_8$ in an amount of 5.0 wt. % was added to the positive electrode active material obtained in Example 1 that contains 1.0 wt. % of $LiVOPO_4$ as the second compound. Thus, an active material and a half-cell of Example 44 were produced. The results of XRD indicated that the second compounds contained in the active material were $LiVOPO_4$ and $LiV_3O_8$ and the total content thereof was 6.0 wt. %.

Example 45

In this example, 0.4 wt. % of $V_2O_5$ and 0.5 wt. % of $LiV_3O_8$ were added to the positive electrode active material obtained in Example 2 that contains 0.1 wt. % of $LiVOPO_4$ as the second compound. Thus, an active material and a half-cell of Example 45 were produced. The results of XRD indicated that the second compounds contained in the active material were $LiVOPO_4$, $V_2O_5$, and $LiV_3O_8$ and that the total content thereof was 1.0 wt. %.

Example 46

In this example, 0.3 wt. % of $V_2O_5$ and 0.1 wt. % of $LiV_3O_8$ were added to the positive electrode active material obtained in Example 2 that contains 0.1 wt. % of $LiVOPO_4$ as the second compound. Thus, an active material and a half-cell of Example 46 were produced. The results of XRD indicated that the second compounds contained in the active material were $LiVOPO_4$, $V_2O_5$, and $LiV_3O_8$ and that the total content thereof was 0.5 wt. %.

Example 47

In this example, 1.0 wt. % of $V_2O_5$ and 1.0 wt. % of $LiV_3O_8$ were added to the positive electrode active material obtained in Example 1 that contains 1.0 wt. % of $LiVOPO_4$ as the second compound. Thus, an active material and a half-cell of Example 47 were produced. The results of XRD indicated that the second compounds contained in the active material were $LiVOPO_4$, $V_2O_5$, and $LiV_3O_8$ and that the total content thereof was 3.0 wt. %.

Example 48

In this example, 1.2 wt. % of $V_2O_5$ and 1.8 wt. % of $LiV_3O_8$ were added to the positive electrode active material obtained in Example 3 that contains 3.0 wt. % of $LiVOPO_4$ as the second compound, which was. Thus, an active material and a half-cell of Example 48 were produced. The results of XRD indicated that the second compounds contained in the active material were $LiVOPO_4$, $V_2O_5$, and $LiV_3O_8$ and that the total content thereof was 6.0 wt. %.

Comparative Example 1

An active material and a half-cell of Comparative Example 1 were produced by a method similar to that of Example 1 except that the second compound was not mixed. The results of XRD indicated that the second compound contained in the active material was not confirmed, That is, the active material had a single phase of $Li_3V_2(PO_4)_3$.

Comparative Example 2

An active material of Comparative Example 2 was synthesized by an experiment method similar to the method according to "Y. Q. Qiao. et., al., Electrochem. Acta 56 (2010) 510-516". Further, a half-cell containing the active material of Comparative Example 2 was produced. From the results of XRD, the second compound contained in the active material was not confirmed. That is, the active material had a single phase of $Li_3V_2(PO_4)_3$.

For each of Examples 1 to 48 and Comparative Examples 1 and 2, the ratio (discharge retention) of the discharge capacity per 1 gram of the active material at the discharge rate 2 C to the discharge capacity per 1 gram of the active material at the discharge rate 0.1 C was obtained. The results are shown in Table 1.

TABLE 1

| | Second compound | Content of second compound wt. % | Capacity retention (2 C/0.1 C) % |
|---|---|---|---|
| Example 1 | $LiVOPO_4$ | 1.0 | 97 |
| Example 2 | $LiVOPO_4$ | 0.1 | 93 |
| Example 3 | $LiVOPO_4$ | 0.5 | 98 |
| Example 4 | $LiVOPO_4$ | 2.0 | 94 |
| Example 5 | $LiVOPO_4$ | 3.0 | 93 |
| Example 6 | $LiVOPO_4$ | 5.0 | 91 |
| Example 7 | $LiVOPO_4$ | 0.05 | 85 |
| Example 8 | $LiVOPO_4$ | 6.0 | 84 |
| Example 9 | $V_2O_5$ | 1.0 | 92 |
| Example 10 | $V_2O_5$ | 0.1 | 95 |
| Example 11 | $V_2O_5$ | 0.5 | 97 |
| Example 12 | $V_2O_5$ | 2.0 | 94 |
| Example 13 | $V_2O_5$ | 3.0 | 97 |
| Example 14 | $V_2O_5$ | 5.0 | 92 |
| Example 15 | $V_2O_5$ | 0.05 | 84 |
| Example 16 | $V_2O_5$ | 6.0 | 83 |
| Example 17 | $LiV_2O_4$ | 1.0 | 93 |
| Example 18 | $LiV_2O_4$ | 0.1 | 96 |
| Example 19 | $LiV_2O_4$ | 0.5 | 96 |
| Example 20 | $LiV_2O_4$ | 2.0 | 94 |
| Example 21 | $LiV_2O_4$ | 3.0 | 91 |
| Example 22 | $LiV_2O_4$ | 5.0 | 92 |
| Example 23 | $LiV_2O_4$ | 0.05 | 86 |
| Example 24 | $LiV_2O_4$ | 6.0 | 84 |
| Example 25 | $LiV_3O_8$ | 1.0 | 95 |
| Example 26 | $LiV_3O_8$ | 0.1 | 93 |
| Example 27 | $LiV_3O_8$ | 0.5 | 96 |
| Example 28 | $LiV_3O_8$ | 2.0 | 98 |
| Example 29 | $LiV_3O_8$ | 3.0 | 93 |
| Example 30 | $LiV_3O_8$ | 5.0 | 94 |
| Example 31 | $LiV_3O_8$ | 0.05 | 85 |
| Example 32 | $LiV_3O_8$ | 6.0 | 85 |
| Example 33 | $LiVOPO_4$, $V_2O_5$ | 1.0 | 97 |
| Example 34 | $LiVOPO_4$, $V_2O_5$ | 0.5 | 93 |
| Example 35 | $LiVOPO_4$, $V_2O_5$ | 3.0 | 99 |
| Example 36 | $LiVOPO_4$, $V_2O_5$ | 6.0 | 83 |
| Example 37 | $V_2O_5$, $LiV_2O_4$ | 1.0 | 95 |
| Example 38 | $V_2O_5$, $LiV_2O_4$ | 0.5 | 94 |
| Example 39 | $V_2O_5$, $LiV_2O_4$ | 3.0 | 96 |
| Example 40 | $V_2O_5$, $LiV_2O_4$ | 6.0 | 84 |
| Example 41 | $LiVOPO_4$, $LiV_3O_8$ | 1.0 | 93 |
| Example 42 | $LiVOPO_4$, $LiV_3O_8$ | 0.5 | 96 |
| Example 43 | $LiVOPO_4$, $LiV_3O_8$ | 3.0 | 92 |
| Example 44 | $LiVOPO_4$, $LiV_3O_8$ | 6.0 | 86 |
| Example 45 | $LiVOPO_4$, $V_2O_5$, $LiV_3O_8$ | 1.0 | 91 |
| Example 46 | $LiVOPO_4$, $V_2O_5$, $LiV_3O_8$ | 0.5 | 97 |
| Example 47 | $LiVOPO_4$, $V_2O_5$, $LiV_3O_8$ | 3.0 | 95 |
| Example 48 | $LiVOPO_4$, $V_2O_5$, $LiV_3O_8$ | 6.0 | 84 |
| Comparative Example 1 | — | 0 | 76 |
| Comparative Example 2 | — | 0 | 79 |

From the capacity retention of each of Examples 1 to 48, it is found that the positive electrode material for a lithium ion secondary battery containing the first compound represented by $Li_3V_2(PO_4)_3$ and the second compound selected from vanadium oxide and lithium vanadium phosphate has excellent capacity retention even at high-rate discharge.

Moreover, it is found that the positive electrode material for a lithium ion secondary battery exhibits excellent capacity retention when the amount of the second compound relative the amount of the first compound is 0.1 wt. % to 5.0 wt. %.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A positive electrode material for a lithium ion secondary battery, comprising:
    a first compound represented by $Li_3V_2(PO_4)_3$; and
    a second compound selected from vanadium oxide, lithium vanadium oxide, and lithium vanadium phosphate, wherein the content of the second compound relative to the first compound is 0.1 wt. % or more and 5 wt. % or less.

2. The positive electrode material for a lithium ion secondary battery according to claim 1, wherein the second compound contains at least one of $V_2O_5$, $LiV_2O_4$, $LiV_3O_8$, and $LiVOPO_4$.

3. The positive electrode material for a lithium ion secondary battery according to claim 1, wherein the content of the second compound relative to the first compound is 0.5 wt. % or more and 1.5 wt. % or less.

4. The positive electrode material for a lithium ion secondary battery according to claim 3, wherein the first compound has a particle diameter of 100 nm to 10 μm.

5. The positive electrode material for a lithium ion secondary battery according to claim 4, wherein the second compound has a particle diameter of 10 nm to 1 μm.

6. The positive electrode material for a lithium ion secondary battery according to claim 1, wherein the first compound has a particle diameter of 100 nm to 10 μm.

7. The positive electrode material for a lithium ion secondary battery according to claim 6, wherein the second compound has a particle diameter of 10 nm to 1 μm.

8. The positive electrode material for a lithium ion secondary battery according to claim 1, wherein the second compound has a particle diameter of 10 nm to 1 μm.

9. A lithium ion secondary battery comprising the positive electrode for a lithium ion secondary battery according to claim 8.

10. The positive electrode material for a lithium ion secondary battery according to claim 1, wherein the second compound has a smaller particle diameter than that of the first compound.

11. A positive electrode for a lithium ion secondary battery, comprising the positive electrode material for a lithium ion secondary battery according to claim 1.

* * * * *